(12) United States Patent
Rupprecht et al.

(10) Patent No.: US 9,833,990 B2
(45) Date of Patent: Dec. 5, 2017

(54) METHOD FOR INKJET PRINTING ON AT LEAST ONE CURVED REGION OF A SURFACE OF AN OBJECT AND DEVICE FOR IMPLEMENTING THE METHOD

(71) Applicant: HEIDELBERGER DRUCKMASCHINEN AG, Heidelberg (DE)

(72) Inventors: Andreas Rupprecht, Mauer (DE); Michael Fuener, Karlsruhe (DE); Tobias Mueller, Hirschberg (DE)

(73) Assignee: Heidelberger Druckmaschinen AG, Heidelberg (DE)

( * ) Notice: Subject to any disclaimer, the term of this patent is extended or adjusted under 35 U.S.C. 154(b) by 0 days.

(21) Appl. No.: 15/427,192

(22) Filed: Feb. 8, 2017

(65) Prior Publication Data
US 2017/0232733 A1 Aug. 17, 2017

(30) Foreign Application Priority Data
Feb. 17, 2016 (DE) .......................... 10 2016 202 398

(51) Int. Cl.
*B41J 2/045* (2006.01)
*B41J 3/407* (2006.01)
*B41M 5/00* (2006.01)

(52) U.S. Cl.
CPC ....... *B41J 2/04536* (2013.01); *B41J 2/04586* (2013.01); *B41J 3/4073* (2013.01); *B41M 5/0082* (2013.01)

(58) Field of Classification Search
CPC .. B41J 2/04536; B41J 2/04586; B41J 3/4073; B41M 5/0082
See application file for complete search history.

(56) References Cited

U.S. PATENT DOCUMENTS

| 9,266,353 | B2 | 2/2016 | Beier et al. | |
| 9,533,506 | B2 * | 1/2017 | Kraus | B41J 2/16552 |
| 9,636,928 | B2 * | 5/2017 | Noell | B41J 3/4073 |
| 2001/0019340 | A1 | 9/2001 | Kubo et al. | |

(Continued)

FOREIGN PATENT DOCUMENTS

| DE | 102012006371 A1 | 7/2012 |
| DE | 102011086015 A1 | 5/2013 |

(Continued)

*Primary Examiner* — Henok Legesse
(74) *Attorney, Agent, or Firm* — Laurence A. Greenberg; Werner H. Stemer; Ralph E. Locher

(57) ABSTRACT

A method for inkjet printing an image onto a curved region of an object surface includes applying a screen of ink drops to the region to create print dots, calculating the screen using a computer and generating and applying ink drops to the region using a print head having nozzles on a nozzle surface. The steps include a) providing data representing the print image, b) providing or calculating data representing the region, c) providing or calculating path data on paths for the print head or object, d) calculating application locations of ink drops using data from steps b) and c), e) calculating data based on tiling the region using data from step d), f) calibrating tone values using data from step e), g) screening the print image using data from step f), and h) printing the screened image onto the region. A device implementing the method is also provided.

8 Claims, 3 Drawing Sheets

(56) References Cited

U.S. PATENT DOCUMENTS

| | | |
|---|---|---|
| 2013/0076817 A1 | 3/2013 | Olson et al. |
| 2015/0062244 A1* | 3/2015 | Noell ............ B41F 17/28 347/37 |

FOREIGN PATENT DOCUMENTS

| | | |
|---|---|---|
| DE | 102014011301 A1 | 12/2014 |
| DE | 102015205631 A1 | 6/2015 |
| EP | 2287722 A1 | 2/2011 |
| EP | 2327555 A1 | 6/2011 |
| EP | 2591917 A1 | 5/2013 |
| GB | 2313278 A | 11/1997 |
| JP | 2011227782 A | 11/2011 |
| WO | 2004016438 A1 | 2/2004 |

\* cited by examiner

METHOD FOR INKJET PRINTING ON AT LEAST ONE CURVED REGION OF A SURFACE OF AN OBJECT AND DEVICE FOR IMPLEMENTING THE METHOD

CROSS-REFERENCE TO RELATED APPLICATION

This application claims the priority, under 35 U.S.C. §119, of German Patent Application DE 10 2016 202 398.5, filed Feb. 17, 2016; the prior application is herewith incorporated by reference in its entirety.

BACKGROUND OF THE INVENTION

Field of the Invention

The present invention relates to an inkjet printing method for printing on at least one curved region on the surface of an object. The invention further relates to a device for implementing the method.

The technical field of the invention is the field of printing on surfaces of three-dimensional objects or bodies. The surfaces may be curved and are printed-on in an inkjet process. For that purpose, a robot arm guides an inkjet print head along the surface to be printed-on at a printing distance.

Many patent applications and patents describing inventions in the technical field indicated above are known from the prior art. The Applicant of the instant application has filed patent applications in that technical field, e.g. German Patent Application DE 10 2012 006 371 A1, corresponding to U.S. Pat. No. 9,266,353; German Patent Application DE 10 2014 011 301 A1, corresponding to U.S. Patent Application Publication US 2015/0062244; and German Patent Application DE 10 2015 205 631 A1. Those patent applications and patents include detailed descriptions of devices and methods for providing any desired printed image to any location on any desired three-dimensional object or rather on any type of curved surface thereof. As indicated above, an inkjet print head guided by a robot is used in the process. Both the robot and the print head are connected to a control unit, i.e. a computer, that is equipped with the required computing programs and data for controlling the movement of the robot and the ejection of ink by the print head in accordance with the printed image.

In contrast to printing on flat substrates such as sheets of paper, a problem with printing on curved surfaces is that the density of the ink droplets that are applied to the surface to be printed-on and the tone values created in that way may be subject to fluctuation. Those fluctuations cause undesirable visible defects in the printed image. Such fluctuations and defects thus need to be avoided.

Japanese Patent Application JP 2011227782 A likewise deals with printing on objects and discloses a method for that purpose. However, that document does not provide information on the aforementioned question of how to avoid undesired tone value fluctuation and the technical measures to be taken to do that.

SUMMARY OF THE INVENTION

It is accordingly an object of the invention to provide an improved method for inkjet printing on at least one curved region of a surface of an object and a device for implementing the method, which overcome the hereinafore-mentioned disadvantages of the heretofore-known methods and devices of this general type and which can be used for printing on any desired curved surface of any desired three-dimensional object while avoiding undesired defects, in particular tone value fluctuations, in the image to be printed.

With the foregoing and other objects in view there is provided, in accordance with the invention, a method for printing an image onto at least one curved region of the surface of an object in an inkjet process wherein a screen of ink drops is applied to the region to create print dots and wherein the screen is calculated by a computer and the ink drops are generated and applied to the region by a print head by using nozzles on a nozzle surface of the print head. The following steps a) to g) are carried out by the computer and the following step h) is carried out by the print head: a) providing data representing the print image, b) providing or calculating data that represent the region, c) providing or calculating path data on the paths on which the print head or object moves, d) calculating the application locations of the ink drops using the data from steps b) and c), e) calculating data based on a tiling of the region using the data from step d), f) calibrating the tone values using the data from step e), g) screening the print image using the data from step f), and h) printing the screened image onto the region.

The method of the invention advantageously allows any surface of any curvature or shape of three-dimensional objects to be printed on. The method further allows any desired print image to be placed on any desired location on the object. The method finally allows undesired density fluctuation of the drops on the surface and the corresponding undesired tone value fluctuation to be avoided (or at least sufficiently reduced), creating visually appealing three-dimensional printed products (three-dimensional objects with printed images). Steps a) to g) and in particular steps e) and f) of the method of the invention are carried out to this end.

Advantageous and thus preferred further developments of the invention will become apparent from the associated dependent claims as well as from the description and the associated drawings.

A preferred further development of the method of the invention may be distinguished in that step d) includes the following step d1) of projecting the locations of the nozzles onto the surface.

A preferred further development of the method of the invention may be distinguished in that step d) includes the following step d2) of correcting the projection under consideration of at least the application speed of the ink drops relative to the surface.

A preferred further development of the method of the invention may be distinguished in that step e) includes the following step e1) of assigning irregular tiles to the print dots and e2) of calculating the respective surface area of the tiles.

A preferred further development of the method of the invention may be distinguished in that step f) includes the following step of using a calibration function that is a function of the halftone values and the surface areas of the tiles.

A preferred further development of the method of the invention may be distinguished in that step g) includes two steps, either g1) re-projection of the locations of the print dots into the nozzle surface and g2) screening in a 2D screening process, or g3) screening in a 3D screening process and g4) re-projection of the locations of the print dots into the nozzle surface. In addition, drop sizes that have been established or calculated beforehand may be re-projected into the nozzle surface.

A preferred further development of the method of the invention may be distinguished in that an additional step B' includes the following step of mapping the printed image onto the surface.

With the objects of the invention in view, there is concomitantly provided a device for implementing the method described above or the further developments of the method. The device includes a robot, a print head and a computer. The computer is configured to implement steps a) to g) and to subsequently actuate the robot and the print head, the robot carries out a movement and the print head generates ink drops in the process.

Other features which are considered as characteristic for the invention are set forth in the appended claims.

Although the invention is illustrated and described herein as embodied in a method for inkjet printing on at least one curved region of a surface of an object and a device for implementing the method, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
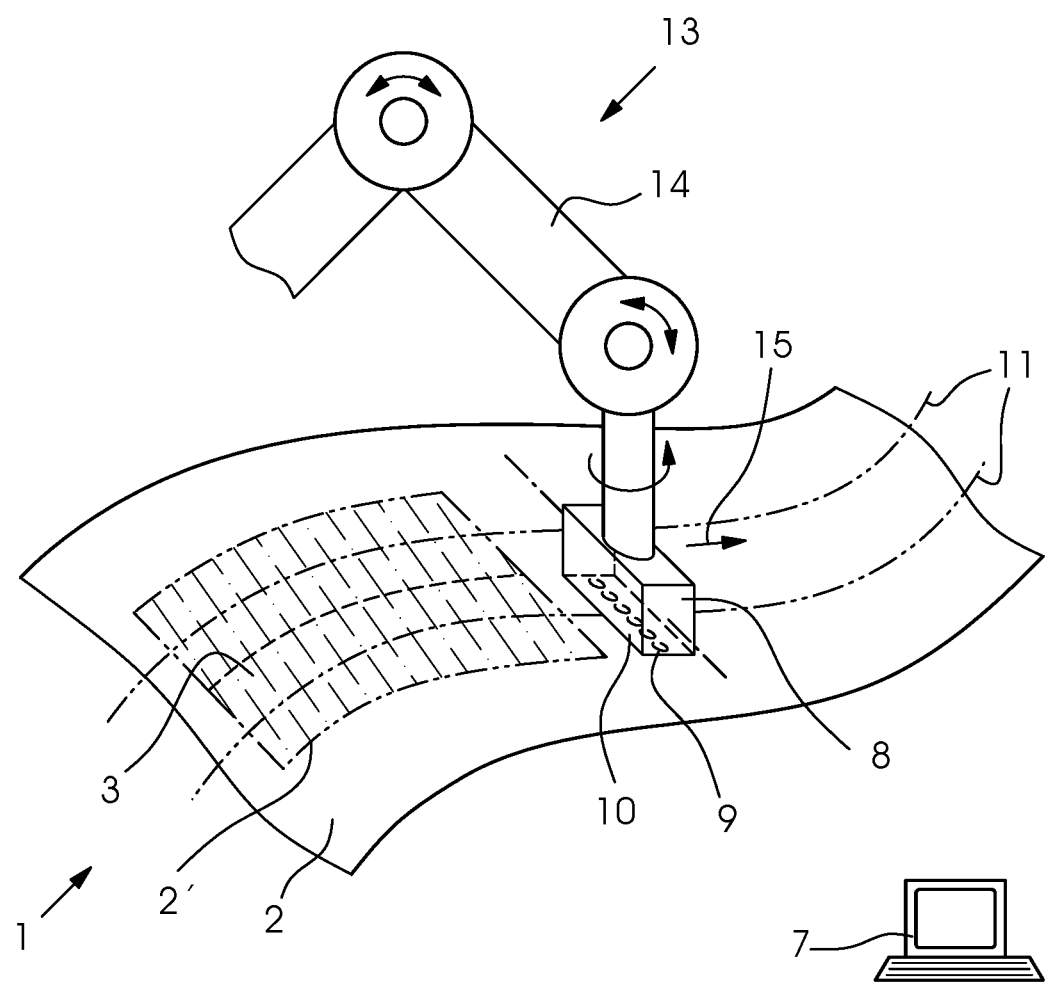
FIG. 1 is a fragmentary, diagrammatic, perspective view of a device for implementing a preferred exemplary embodiment of the method of the invention.

Referring now to the figures of the drawings in detail and first, particularly, to FIG. 1 thereof, there is seen a device which includes a robot 13 having a robot arm 14, a print head 8 fixed to the robot arm, and a computer 7 for controlling the movement of the robot and the ejection of ink by the print head. The robot is preferably a multi-axis robot, e.g. an articulated robot, in particular a so-called industrial robot. The print head is an inkjet print head having a nozzle surface 10 including at least one row of nozzles 9. The nozzles may be controlled individually. As the print head moves, the nozzles eject ink drops in accordance with the image to be printed.

The robot 13 guides the print head 8 along an object 1. The object has a curved surface 2 including a region 2' where a print image 3 is to be applied. Since the region 2' is wider than the printing width of the print head 8 the print head is moved along the object in multiple passes 11 in a direction of movement 15 and at a printing distance relative to the surface. The image strips that are created in this way are contiguous, creating the printed image 3.

Figure 5:
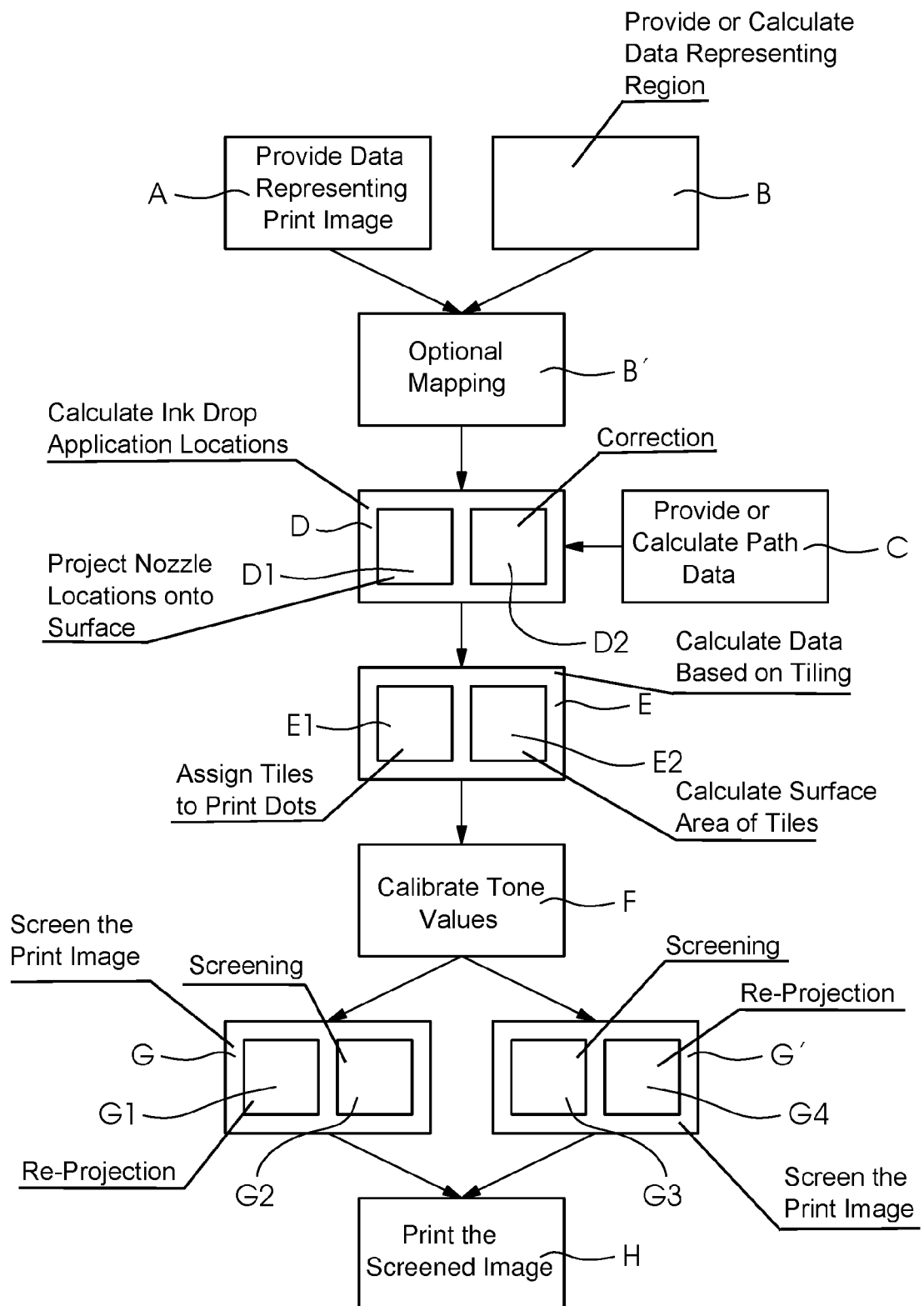
FIG. 5 is a flow chart of a preferred embodiment of the method of the invention.

The preferred exemplary embodiment of the method of the invention will be described below with reference to the other figures, in particular FIG. 5, and the illustrated flow chart including steps A to H.

Step A: providing data that represent the print image:

In step A, the computer 7 is provided with the required data for the image 3 to be printed as far as the data have not been made available beforehand. These data may be provided as a so-called bitmap, for instance, containing information on the color values in a matrix-like way. The print image may be a solid color area, a pattern, text, a logo, a picture or the like or any desired combination thereof. It is preferably a multicolor image. Since such multicolor images are usually available in so-called color separations, the print image data may represent several individual sets of data for the individual color separations (CMYK). The print image data may furthermore be formed of several individual print images to be applied to different locations on the surface of the object.

Step B: providing or calculating data that represent the region:

In order to be able to accurately print on the curved surface 2 of the object 1, data that accurately describe the object and its surface need to be provided. The provision of such data has already been described in detail in German Patent Application DE 10 2012 006 371 A1, corresponding to U.S. Pat. No. 9,266,353 and German Patent Application DE 10 2014 011 301 A1, corresponding to U.S. Patent Application Publication US 2015/0062244. Thus, in terms of the provision of data that describe the object and the surface thereof, reference is made to the disclosures of those documents which are incorporated herein by reference.

Optional step B': mapping:

The process known as mapping or texture mapping uses the data of the print image 3 from step A and the region data from step B. In this process, the print image 3 is positioned in the region 2' (in a purely computational process). In other words, the place in which the print image is to be positioned and the way in which it is to be positioned are defined as a function of structural details. For instance, the print image may be shifted, rotated, or distorted (again in a purely computational process).

Step C: providing or calculating path data on the path that is followed by the print head or object:

The previous steps A, B, and B' have established which print image 3 is to be placed on which object 1 or rather on which surface 2 thereof. As described above, the creation of this print image in most cases requires the print head 8 to be passed over the surface a number of times, assembling the print image in strips. Thus, a path for the robot 13 and the print head 8 guided by the robot needs to be planned. The way in which such a path is planned is described in detail in German Patent Application DE 10 2014 011 301 A1, corresponding to U.S. Patent Application Publication US 2015/0062244; and German Patent Application DE 10 2015 205 631 A1, which are incorporated herein by reference. Thus, in terms of planning the paths, reference is made to the relevant sections in the disclosures of the documents indicated above.

Step D: calculating the application locations of the ink drops using the data from steps B and C:

In the case of curved surfaces 2, the movement of the print head 8 by using the robot 13 along paths 11 and thus along the surface 2 of the object 1 causes the distances between adjacent ink drops 5 applied to the surface to vary. For instance, if the print head 8 is moved on a path 11 shaped like a segment of a circle, the print dots created by the ink drops at the inner edge of the path are closer to one another than the dots at the outer edge of the path. In other words, the density of the print dots may depend on the location and as a consequence, depending on the location, too many or too few ink drops may be applied to the surface. Thus, without the corrective measure described below, too much or too little ink would be applied to some locations, resulting in undesired defects in the print.

In step D, in particular in partial step D1, the locations of the nozzles 9 of the print head 8 are projected onto the surface 2. This projection is a computational process preferably implemented on the computer 7. When the print image, the curved surface to be printed on, the position, the orientation, and, if applicable, the distortion of the print image are known, a decision may be made for every nozzle of the print head at any point in time, i.e. at any location on the path 11 whether to eject a drop or not and where the drop will land on the surface of the object (for an ideal, i.e. straight dropping path). The computing process that is implemented in the computer 7 for this purpose is basically an algorithm that implements the computing steps of projecting the locations of the nozzles onto the surface of the object and may thus be an equivalent to a purely computational simulation of the future printing process.

In addition to this purely geometric projection, a step D2 may advantageously also include a correction that factors in the application speed of the ink drops 5 relative to the surface. This is because the ink droplets do not drop along an ideal, straight path from the nozzle to the surface. Rather, in addition to the speed component in the direction of the surface 10 (due to the ejection of the ink drop from the nozzle), a speed component that may be substantially parallel to the surface is imparted to every ink drop due to the movement of the print head 8 along the surface 2 of the object 1. The superposition of the speed components of the ink drop results in a curved dropping path. Since the movement of the head, in particular the speed thereof, is known, the additional speed component of the ink drop may be determined and the actual point of impact of a drop on the surface may be determined (computationally). This calculation is preferably also carried out by the computer 7. The calculation may preferably be based on a physical model or an empirically parameterized model. The process advantageously uses the following input parameters of: drop size, speed in the x and z directions (x=direction of movement of the head, z=direction perpendicular to the surface), distance to the surface, and friction factor for the deceleration of the ink drop in air.

Figure 2:
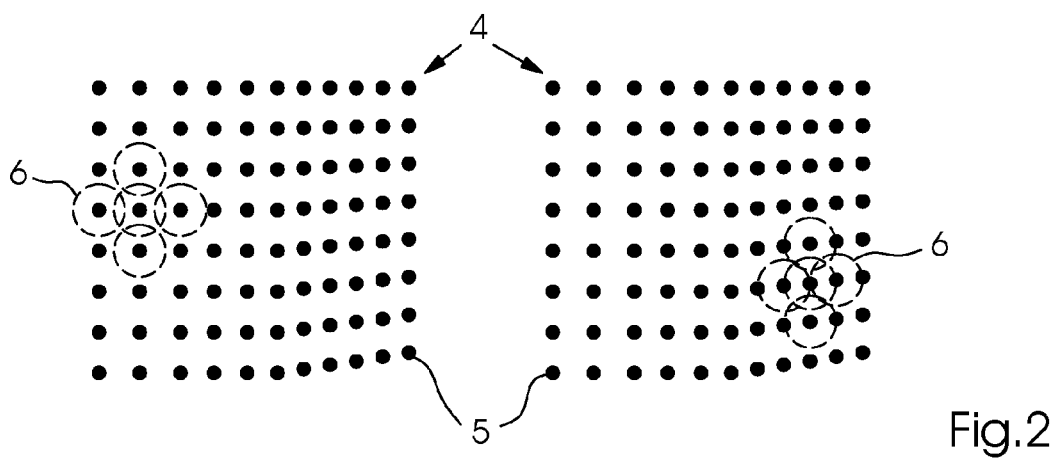
FIG. 2 is a diagrammatic representation of print dots that have been created in accordance with the invention.

Step E: calculation of data based on a tiling of the region using the data from step D:

As with any other, conventional printing process, the image data to be printed need to be subjected to a screening process on a raster image processor (RIP). Although screening processes are known for printing two-dimensional images onto flat, two-dimensional surfaces, those methods are not readily applicable to printing images onto curved surfaces of three-dimensional bodies. FIG. 2 illustrates why this is the case. A screen or dot pattern 4 of print dots 6 created by applied ink drops 5 is shown to the left and right of FIG. 2. The distance between a print dot 6 and its neighbor marked on the left of FIG. 2 is greater than the distance between a print dot 6 and its neighbor marked on the right. As explained above, this may be caused by the fact that the print head usually moves along the curved surface on a curved path, causing ink drops potentially to be placed closer together or further apart. FIG. 2 additionally shows that where the dots are closer together, the color is darker, whereas in places where the print dots are farther apart, the color is lighter. This density fluctuation of the print dots on the surface needs to be factored in and corrected at the right time in the screening process (RIP process). At this point, it is to be understood that the black dots shown in FIG. 2 are intended to represent the locations in which the ink drops hit the surface whereas the circles are intended to represent the approximate sizes of the print dots that are created in this way. In this context it is important to know that the ink drops spread on the surface, i.e. they expand and potentially diffuse into the material if the material is absorbent. This may result in a superposition of the applied print dots. In general, this is a desirable effect in particular if solid color areas are to be created. However, an undesirable effect is that the print dot overlap may be too great or too small, resulting in undesired brightness fluctuations in the printed image.

Figure 3:
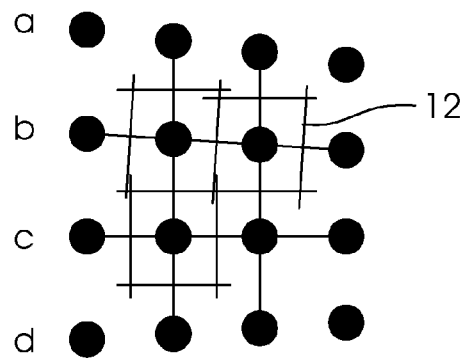
FIG. 3 is a diagrammatic representation of a preferred tiling used in accordance with the invention.

In order to avoid the potentially detrimental influences described above, a computational process referred to as tiling is carried out. This process will be described below with reference to FIG. 3. FIG. 3 is an enlarged view of a number of print dots 6 from FIG. 2. Every print dot 6 is assigned a surrounding tile 12, which is preferably defined individually for every print dot. In other words, in places where the print dots would be closer, tiles of a smaller surface area are selected in the tiling process, whereas in places in the printed image where the density would increase, tiles of a greater surface area are selected in the tiling process.

Figure 4:
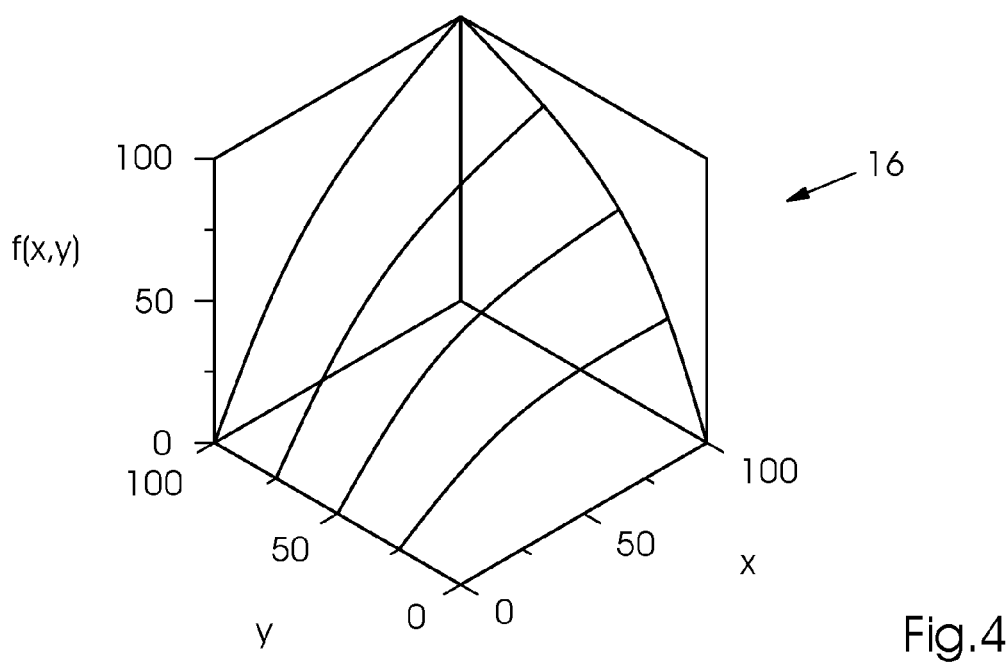
FIG. 4 is a simplified graphical representation of a preferred calibration function used in accordance with the invention.

The example shown in FIG. 4 indicates how such a tiling may look: for instance, irregular quadrangles are selected. These irregular quadrangles may for instance be generated in such a way that they are delimited by the perpendicular bisector between two adjacent print dots. At this point it is again pointed out that the tiling is a purely computational process preferably implemented on the computer 7.

Thus, in a step E1, an individual tile 12 is assigned to every print dot 6, i.e. the various print dots are assigned irregular tiles, and in a step E2, the surface area of the assigned tile is calculated for every print dot. This calculation is preferably likewise carried out on the computer 7.

Since the dimensions of the tiles are small, the calculation of the surface areas may be based on the assumption that the individual tiles have no curvature, to make matters simpler. Another assumption may be that the respective tile is located in a tangential plane extending through the print dot.

Step F: calibration of the tone values using the data from step E:

So-called tone value calibration is known in conventional 2D printing processes (flat print images on flat substrates). For such a tone value calibration, calibration curves are known to plot the tone values (0 to 100%) over an axis for area coverage (0 to 100%). Such a calibration curve is usually not a straight line with a 45° gradient but rather a bent curve. That is to say that a tone value of 60%, for instance, is not attained at an area coverage of 60%, but at an area coverage of 50%.

The invention now likewise envisages the implementation of a calibration process, preferably using a so-called extended or 3D calibration. A calibration function which is advantageously usable in this process is shown in FIG. 4. The function 16 forms a surface above the X and Y axes. The halftone value or area coverage is indicated on the X axis, whereas the surface area of the respective tile is indicated on the Y axis. The calculated surface areas of the respective tiles may be scaled to values between zero and 100. FIG. 4 shows that the gradient of a curve through the surface area value 75 is steeper than the gradient of a curve through the surface area value 50 and the gradient of a curve through the surface area value 25 is less steep than the gradient of a curve through the surface area value 50. The calibration function 16 thus includes a correction of the tone values as a function of the previously calculated surface areas of the respective tiles. The provided 3D calibration function may be used to determine whether a tone value for a give print dot needs to be increased or reduced.

Alternatively, values above a value of 100 may be plotted on the Y axis, with a value 100 for instance corresponding to the nominal surface area of a tile (i.e. for tiles of a regular checkered tiling) and values above 100 corresponding to a larger tile and values below 100 corresponding to a smaller tile. For instance, the Y axis may extend from zero to approximately 120.

The surface areas of the tiles may be scaled to the nominal pixel size of the printing system. By way of example, a printing system that has a resolution of 360 dpi has a nominal print dot size, i.e. a surface area, of 70.5 µm times 70.5 µm.

A parametric correlation may be used in order to determine the calibration function 16. Alternatively, the function may be determined by an interpolation of measured nodes.

Step G: screening of the print image using the data from step F:

Screening is done to decide or calculate for every possible ink drop whether it is to be made or not, i.e. to decide for every nozzle whether or not it is to emit a drop onto the surface of the object that is in the effective range of the nozzle at a given time to create a print dot. If the print head supports drops of different sizes (e.g. small, medium, large), the screening process may also determine or calculate the drop size to be used for the print dot to be created.

In accordance with the invention, screening may be implemented in two different ways. The first alternative will now be described. In accordance with the first alternative, the locations of the print dots are calculated back from the surface 2 of the object 1 to the nozzle surface 10 of the print head 8. If the data of this reverse calculation are already known from at least one of steps A to D, this purely computational re-projection may be dispensed with. The re-projection is equivalent to the use of the data that are already available. Re-projection onto the nozzle surface is understood to be a re-projection into a surface section that is parallel to the surface on the object to be printed on and in which the nozzle surface moves. This surface, referred to as an envelope surface, is generally likewise curved. Depending on the curvature of the surface of the object, the nozzle surface of the head will not always be completely located in this envelope surface. Thus, for the calculation, the assumption may be made that a central nozzle of the nozzle surface will always be located within the envelope surface. Other nozzles (in particular near the edges) may then be above or below the envelope surface.

After the so-called re-projection, it is known (or rather, the required data have been calculated) which nozzle needs to be activated in which location and at what time to position a drop in a way to ensure that the drop is placed in the right location of the printed image on the object.

In addition to this re-projection step G1, a screening step G2 will be carried out. A conventional 2D screening process may be used for this purpose. The process does not require a tone value calibration because a so-called 3D tone value calibration has already been carried out in step F.

Alternatively, a step G' including substeps G3 and G4 may be carried out as follows: In this alternative, the screening is done before the re-projection of the locations of the print dots onto the nozzle surface. However, a so-called 3D screening process is required for this purpose. Such a 3D screening process is different than the conventional 2D screening processes and is done directly on the three-dimensional surface of the object in a computational process. For instance, an error diffusion method known for a 2D process may be suitably adapted to a 3D process.

The determination or calculation of different drop sizes—as far as this is technically feasible and actually envisaged for the print head that is used and/or for its control unit—may be implemented in the course of the 2D or 3D screening process as described above.

Step H: printing the screened print image onto the region:

In this last step, the data obtained in the previous computing steps are used to actuate the print head 8 during its movement by using the robot 13 along the surface 2 of the object 1 in such a way that the desired image 3 is created in the desired position without any detrimental density fluctuation.

The invention claimed is:

1. A method for inkjet printing a print image onto at least one curved region of a surface of an object, the method comprising the following steps:
    applying a screen of ink drops to a region to create print dots by calculating the screen using a computer, and creating and applying the ink drops to the region using nozzles of a nozzle surface of a print head;
    carrying out the following steps a) to g) on the computer:
        a) providing data representing the print image;
        b) providing or calculating data representing the region;
        c) providing or calculating path data on paths on which the print head or the object moves;
        d) calculating application locations of the ink drops using the data from steps b) and c);
        e) calculating data based on a tiling of the region using data from step d);
        f) calibrating tone values using the data of step e);
        g) screening the print image using data from step f); and
    carrying out the following step h) by using the print head:
        h) printing the screened image onto the region.

2. The method according to claim 1, wherein step d) includes a step d1) of projecting the locations of the nozzles onto the surface.

3. The method according to claim 2, wherein step d) includes a step d2) of correcting the projection by factoring in at least an application speed of the ink drops relative to the surface.

4. The method according to claim 1, wherein step e) includes a step e1) of assigning irregular tiles to the print dots, and a step e2) of calculating surface areas of the respective tiles.

5. The method according to claim 1, wherein step f) includes using a calibration function that is dependent on the tone values and on surface areas of the tiles.

6. The method according to claim 1, wherein step g) includes either:
    g1) re-projecting the locations of the print dots onto the nozzle surface and g2) screening using a 2D screen process, or
    g3) screening using a 3D screen process and g4) re-projecting the locations of the print dots onto the nozzle surface.

7. The method according to claim 1, which further comprises carrying out an additional step B' of mapping the print image onto the surface.

8. A device for inkjet printing a print image onto at least one curved region of a surface of an object, the device comprising:
- a robot, a print head, and a computer;
- said computer implementing steps a) to g) of claim 1 and subsequently actuating said robot and said print head; and
- said print head generating ink drops while said robot carries out a movement.

\* \* \* \* \*